(12) United States Patent
Toft et al.

(10) Patent No.: US 6,436,547 B1
(45) Date of Patent: Aug. 20, 2002

(54) LAMINATED PACKAGING MATERIAL, METHOD OF MANUFACTURING OF SAID LAMINATED MATERIAL AND PACKAGING CONTAINERS PRODUCED THEREFROM

(75) Inventors: Nils Toft, Göteborg; Ion Postoaca, Bjärred, both of (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/647,370

(22) PCT Filed: Mar. 30, 1999

(86) PCT No.: PCT/SE99/00514

§ 371 (c)(1),
(2), (4) Date: Nov. 17, 2000

(87) PCT Pub. No.: WO99/50066

PCT Pub. Date: Oct. 7, 1999

(30) Foreign Application Priority Data

Apr. 1, 1998 (SE) ................................................ 9801140

(51) Int. Cl.$^7$ ......................... B32B 27/34; B32B 31/24; B65D 81/24
(52) U.S. Cl. .................. 428/474.4; 428/34.2; 428/34.6; 428/34.7; 428/36.91; 428/411.1; 428/475.5; 428/475.8; 264/80; 264/446; 264/454; 264/455; 264/513; 264/515; 264/516; 156/82; 156/244.23; 156/327
(58) Field of Search ............................. 428/474.4, 34.2, 428/34.6, 34.7, 369.1, 411.1, 475.5, 475.8; 264/80, 446, 454–455, 513, 516, 515; 156/82, 244.23, 327

(56) References Cited

U.S. PATENT DOCUMENTS

| | | | |
|---|---|---|---|
| 3,861,994 A | | 1/1975 | Stark |
| 4,264,668 A | | 4/1981 | Balla |
| 4,424,260 A | | 1/1984 | Pupp |
| 4,495,016 A | | 1/1985 | Viberg et al. |
| 4,994,310 A | | 2/1991 | Frisk et al. |
| 5,133,999 A | | 7/1992 | Löfgren et al. |
| 5,143,764 A | | 9/1992 | Rosén |
| 5,164,267 A | * | 11/1992 | D'Heur et al. ........... 428/474.4 |
| 5,433,982 A | | 7/1995 | Yamada et al. |
| 5,489,472 A | | 2/1996 | Andersson |
| 5,695,839 A | | 12/1997 | Yamada et al. |
| 5,705,109 A | * | 1/1998 | Parks .......................... 264/80 |
| 5,725,917 A | * | 3/1998 | Parks ........................ 428/34.2 |
| 5,955,180 A | * | 9/1999 | Harada et al. .............. 428/212 |
| 6,010,759 A | | 1/2000 | Yamada et al. |
| 6,113,719 A | * | 9/2000 | Parks et al. ................... 156/82 |
| 6,149,993 A | * | 11/2000 | Parks et al. ................ 428/34.2 |
| 6,193,827 B1 | * | 2/2001 | Parks et al. ................... 156/82 |

* cited by examiner

Primary Examiner—P. Hampton-Hightower
(74) Attorney, Agent, or Firm—Burns, Doane, Swecker & Mathis, L.L.P.

(57) ABSTRACT

The invention relates to a laminated packaging material comprising a core layer of paper or paperboard and a gas barrier layer of a polyarmide blend including a condensation polymer of metaxylene diamine and adipic acid (Nylon-MXD6) and a second crystalline or semicrystalline polyamide, applied on one side of the core layer by means of co-extrusion coating. The invention also relates to a method of producing the laminated packaging material and to a packaging container which is produced from the laminated packaging material.

19 Claims, 3 Drawing Sheets

Figure 1A:
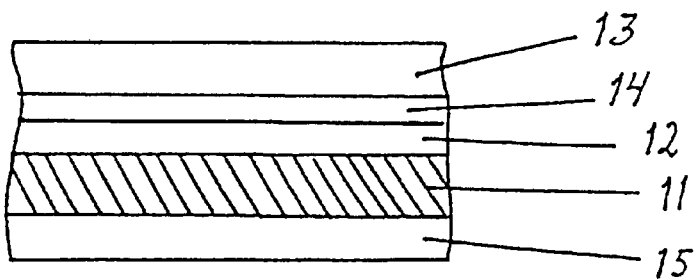

LAMINATED PACKAGING MATERIAL, METHOD OF MANUFACTURING OF SAID LAMINATED MATERIAL AND PACKAGING CONTAINERS PRODUCED THEREFROM

TECHNICAL FIELD

The present invention relates to a laminated packaging material comprising a core layer of paper or paperboard and a gas barrier layer of polyamide, including a condensation polymer of metaxylene diamine and adipic acid (Nylon-MXD6), applied on one side of the core layer together with at least one layer of heat sealable plastics by means of co-extrusion coating.

The present invention also relates to a method of manufacturing of the laminated packaging material according to the invention as well as to a packaging container which is produced from the laminated packaging material.

BACKGROUND ART

Within the packaging industry, it is well known to employ laminated packaging material of a single-use nature for the packaging and transport of liquid foods. Normally, such laminated packaging materials are built-up from a configurationally rigid but foldable core layer consisting, for example, of paper or paperboard in order to achieve good mechanical configurational stability. Liquid-tight coatings of plastic are applied on both sides of the core layer and effectively protect the core layer of liquid-absorbing fibres against penetration by moisture. These outer layers normally consist of thermoplastic, preferably polyethylene, which moreover imparts superior thermosealing properties to the packaging material, whereby the packaging material may be converted into finished packages possessing the desired geometric configuration.

Laminated packaging materials consisting solely of paper or paperboard and liquid-Ught plastic lack, however, tightness properties vis-a-vis gases, in particular oxygen gas. This is a major-drawback in the packing of many foods, whose shelf-life, flavour and nutrient content dramatically deteriorate in contact with oxygen gas. One example of such foods is fruit juices whose vitamin C content declines when they are exposed to oxygen gas. In order to provide packaging materials with a barrier against gases, in particular oxygen gas, it is known in the art to apply a layer possessing superior oxygen gas tightness properties, for example aluminium foil ('Alifoil'), EVOH (ethylene vinyl alcohol) or PVOH (polyvinyl alcohol), on that side of the core layer which is intended to be turned to face towards the interior of the finished package.

It is generally desirable to be able to produce packaging containers for so called "extended shelf life" (ESL) at cooled storage, i.e. to achieve maintained Vitamin C content and quality of the packaged product after about 6 weeks storage at 8° C., about 8 weeks storage at 7° C. or about weeks storage at 4° C.

However, the known gas barriers suffer from certain drawbacks. For example, in certain cases from the points of view of cost, the environment and recycling, it has been deemed appropriate to replace Alifoil as the gas barrier material in food packages. Barrier polymers such as EVOH and PVOH, respectively are highly sensitive to moisture and rapidly lose their barrier properties against oxygen gas when they are exposed to a damp environment. This, among other things, make it necessary to surround gas barrier layers of EVOH and PVOH with layers of another polymer, for instance polyethylene, which is impervious to moisture. Alternatively, EVOH and PVOH, respectively, may be combined with one or more known food approved polymers for forming a continuous, well-integrated layer possessing superior gas barrier properties which are also retained in a damp environment. However, the manufacture of packaging materials including gas barrier layers with EVOH and PVOH, respectively, entails high costs for both material and for the production of the requisite multilayer laminate, since such gas barrier layers must be surrounded by at least one, often two protective outer layers of plastic on each respective side of the laminate.

U.S. Pat. No. 4,777,088 discloses a packaging laminate for the production of juice packages consisting of a core layer of paper or paperboard with a gas barrier layer which is applied thereon and which includes a nylon (not disclosed in any detail), as well as a layer of an ionomer binder, namely Surlyn® applied on the gas barrier layer as an intermediate bonding layer to the innermost (towards the inside of a package) polyolefin layer.

EP 0 520 767 discloses a packaging laminate consisting of a core layer of paper or paperboard and a gas barrier layer including an amorphous polyamide (Selar PA 3426 from DuPont Corp., USA), and a binder layer applied therebetween.

The main drawback with these known packaging laminates is, however, that they do not have sufficiently good gas barrier properties for the purpose of ESL packaging at economical polymer layer thicknesses.

The condensation polyamide polymer of metaxylene diamine and adipic acid, carrying the name "Nylon-MXD6", is a semi-crystalline polyamide and has special properties as compared with other conventional. polyamides, such as, for example, high tensile and flexural strength and modulus, higher glass transition temperature, lower water absorption, as well as excellent gas barrier properties against, for example, oxygen gas.

U.S. Pat. No. 5,164,267 (abandoned), describes a laminated composite consisting of a substrate sheet based on a cellulosic material laminated with a multilayer film comprising at least one layer based on a polyamide resulting from the polycondensation of aliphatic dicarboxylic acid with xylenediamine, e.g. Nylon-MXD6, wherein the multilayer film is co-extrusion coated onto the substrate with a polyolefin layer being the contact layer to the substrate.

However, it is in fact not possible to employ a gas barrier layer consisting solely of Nylon-MXD6 into liquid food paperboard or carton packaging laminates, since this material provides a brittle layer which readily cracks, for example on forming and folding of the packaging material, and therefore gives a poor barrier towards gases and liquids. Moreover, the Nylon-MXD6 in the gas barrier layer also appears to affect thermosealing properties in the process of sealing of the packaging material into packaging containers negatively, which also results in packages which are less gas-tight.

JP-A-06305086 describes a laminate from a biaxially stretched polyamide film and a paper layer, in which the polyamide film comprises at least two polyamide layers, at least one of the layers containing Nylon-MXD6. The biaxially oriented film is laminated to a paper layer by means of dry lamination methods, employing adhesives, or by means of extrusion lamination. Such a biaxially film is thus premanufactured by means of a different process, such as for example film blowing, and then laminated to other layers.

The resulting laminate from JP-A-06305086 is quite different from the one of claim 1 of the present invention. In order to provide adhesion between the paper layer and the polyamide layer, an adhesive, such as urethane adhesive, acrylic adhesive and polyester adhesive, or an intermediate bonding layer must be employed, which in turn requires more and/or different materials in the laminate and thus results in higher production costs and higher environmental impact, from both working environment and nature resource management points of view. Furthermore, the adhesion between the paper layer and the polyamide layer will most likely be worse in such a laminate, since the surface of a pre-manufactured film will be oxidised and/or hardened and will not easily adhere to an extruded bonding layer. In particular, the process is more cumbersome and less cost-effective for producing such a laminate, since it requires an extra step for pre-manufacturing of biaxially oriented film.

DISCLOSURE OF THE INVENTION

It is therefore an object of the present invention to realise a novel, cost-effective, environment friendly and well-integrated, laminated packaging material of the type described by way of introduction, which possesses excellent gas barrier properties, in particular against oxygen gas, as well as good liquid barrier properties and good mechanical properties, such as flexibility and adhesion strength between layers.

A further object of the present invention is to realise a packaging material for producing packaging containers which are particularly well suited for the storage of fruit juices with extended shelf-life of about 6–10 weeks at cooled storage.

These objects are attained according to the present invention by a laminated packaging material comprising a core layer of paper or paperboard and a gas barrier layer of polyamide including a condensation polymer of metaxylene diamine and adipic acid (Nylon-MXD6) applied on one side of the core layer together with at least one layer of heat sealable plastics by means of co-extrusion coating, in which the gas barrier layer further includes a second crystalline or semi-crystalline polyamide.

By mixing Nylon-MXD6 with another crystalline or semi-crystalline polyamide, such as for example PA-6 or PA-6/66, properties can be customised whereby, for example, improved elongation at break and improved sealing properties may be attained. The elongation at break of Nylon-MXD6 is only about 2,3%, while for a standard PA-6 it is normally 400–600%. However, an excessively high quantity of PA-6 will result in poorer gas barrier properties, since this is reduced exponentially with the quantity of PA-6. Examples of usable polyamides in this context are polyamide-6 (PA-6), PA-66, PA-6/66 and blends thereof.

Preferably, according to the invention, the blend of Nylon-MXD6 and the second crystalline polyamide is an immiscible blend, i.e. a two-phase blend for which a DSC measurement indicates two separate melt points or intervals, i.e. shows two melt-peaks instead of only one, with the Nylon-MXD6 as matrix. Such immiscible blends have the advantage of further improved oxygen barrier properties as well as improved tensile strength.

In order to achieve optimal properties in respect of gas barrier properties, mechanical properties, sealing strength and bulging resistance, the proportion of Nylon-MXD6 which is included in the mixture in the gas barrier layer according to the present invention is more than 50 weight per cent and less than 100 weight per cent, preferably 60–90 weight per cent, and most preferably 70–80 weight per cent.

According to one preferred embodiment of the invention, the second polyamide is a "nylon clay hybrid" (NCH), which is a molecule composite consisting of a crystalline polyamide, such as for example PA-6, PA-66, PA-6/66 or PA-12, as well as uniformly distributed silicate layers. The NCH is formed in the polymerisation process by dispersing a clay mineral in the monomer and polymerising, which creates a morphology of extremely fine and well dispersed silicate platelets in the nylon polymer. This, thus, results in an improved oxygen barrier and excellent mechanical properties. Such polyamides are described, for example, in the "journal of Applied Polymer Science, Vol. 49, 1259–1264 (1993)", and "Vol. 55, 119–123 (1995)". The advantage with PA-6 is its low cost, while NCH based on PA-6, PA-66 or PA-6/66 enjoys the advantage that it gives considerably better oxygen gas barrier properties than its respective base polymers. Moreover, NCH is a better moisture barrier than pure PA-6—approximately twice as good. An example of an NCH suitable for the blend of the present invention is based on PA-6 and commercially available from UBE Industries (Grade 1022 CM1).

By thus blending Nylon-MXD6 with NCH based on, for example, PA-6, optimal gas barrier properties as well as mechanical properties are obtained. The proportion of Nylon-MXD6 (which is comparatively costly) can be reduced without the gas barrier properties being lost to the same extent as in the employment of pure PA-6. At the same time, there will be obtained a mixture with considerably higher elongation at break and thereby greater resistance to crack formation in forming and folding, providing a uniform, gas tight barrier layer. A blend of 75 weight % Nylon-MXD6 and 25 weight % NCH-PA6 has an elongation at break of more than 200%.

Furthermore, by using an NCH as the second component of the Nylon-MXD6 blend, the effect of "bulging" is reduced. By "bulging" is meant the effect that the packaging container walls are bellying outwards from the vertical plane between the corners of the package. The increased resistance to bulging by the use of NCH is probably partly due to the contribution of stiffness properties from the NCH material itself. The tensile modulus of NCH-PA6 is for example about 830–880, while for PA-6 it is only about 580–600 N/mm$^2$. In addition, the moisture barrier properties of NCH are approximately twice as good as the one of PA6. It is of great importance to reduce the effect of bulging, since the customers in some countries are particularly prejudiced towards the bulged appearance of packaging containers, believing the bulged appearance being due to the food products being fermented or the like.

According to a second preferred embodiment of the present invention, an even more cost-effective and environment friendly packaging laminate in which the gas barrier properties are further improved is provided, at the same time as a packaging laminate better adapted for the manufacturing of packaging containers having improved seals may be provided. These objects are achieved by applying the polyamide gas barrier layer by means of co-extrusion coating directly onto the core layer of paper or paperboard, without any interjacent adhesive or bonding polymer layer. In this way, intermediate bonding layers are made superfluous and material is saved, thus providing an economical laminate both from an environmental resource, recycling and cost point of view. By the term "extrusion coating" is thus meant the simultaneous extrusion and application of a layer of extrudable plastics onto a substrate, which is different from so-called "extrusion-lamination", i.e. the lamination of a pre-manufactured film to a substrate by means of extrusion of an intermediate bonding layer between a web of the substrate layer and the pre-manufactured film layer. It has been shown that the gas barrier property of a laminate having a three-layer structure with a nylon-MXD6 blend gas-barrier layer, a tie layer and a polyolefin layer coated on the inside of the core layer by co-extrusion, is improved by about 30–40%, compared to that of a laminate having a five-layer structure with a further polyolefin layer in contact with the paperboard layer and a tie layer between the polyolefin layer and the gas barrier layer.

Furthermore, when co-extruding a three-layer structure in one step onto the paperboard, the outermost polyolefin layer of the three layers may be extruded at a lower temperature than when co-extruding a five-layer structure having two outer polyolefin layers onto the paperboard. In five-layer co-extrusion by means of three extruders and a five-layer feed-block, which normally is the case (it is desirable to involve as few extruders as possible in a process), the two outer layers necessarily are extruded at the same temperature. In order to provide adhesion between the layer of LDPE and paperboard, a temperature of about 320° C. would be desirable. However, for the outside layer of the laminate, the LDPE may be extruded at the much lower temperature of 280° C. LDPE extruded at such a low temperature will be subject to less oxidation and will be more suitable for the subsequent heat sealing in the process of converting the packaging laminate into a paper container. The risk of obtaining a taste of "plastic" of the packaged product will also be eliminated if the polyethylene is extruded at the lower temperature. In a five-layer structure, an extrusion temperature somewhere in between must be chosen as a compromise, in order to balance the adhesion to the paperboard against the heat sealability of the outer LDPE layers, since the two LDPE layers originate from the same extruder.

A gas barrier layer comprising the blend of Nylon-MXD6 and PA-6 or NCH has proved to adhere very well to a core layer of paper or paperboard at such high line speeds as are necessary for the production of cost-effective laminates. This is not at all self-evident because different polyamides different properties in this respect. PA-6 normally adheres well to paper board, while an amorphous polyamide does not adhere. With good adhesion is meant that the plastic layer adheres to the paperboard with a strength greater than the cohesion within the paperboard itself. Thus the rupture appearing in a peeling test occurs within the paperboard layer and not between the layers. This can be seen in that the "peeled" plastic layer surface is covered with paper fibres. Similarly, layers of NCH or of a blend of PA-6 and NCH do not adhere to paperboard, while Nylon-MXD6 adheres to a certain extent. However, the bonding between the Nylon-MXD6 and the paper will be easier destroyed because the layer of Nylon-MXD6 is brittle and inflexible in itself and will crack and delaminate from the paperboard when the laminate is bent or twisted.

In comparison with lamination of a gas barrier layer on the core layer with an interjacent layer of polyethylene, it has moreover proved that application of the gas barrier layer directly on the core layer resulted in an approximately 30–40 per cent improved oxygen gas barrier. This may be because of an equalisation of the moisture between the core layer and the gas barrier layer on direct application. When the gas barrier layer is in direct contact with the paper or paperboard layer, the result will, namely, be that moisture from the contents of the packaging container which penetrates into the gas barrier layer is distributed over both the core layer and the gas barrier layer. As a result, a smaller proportion of moisture will remain in the polyamide layer, for which reason the gas barrier properties are better retained in the gas barrier layer in this particular case.

This surprising increase of oxygen barrier properties does not generally apply to all polyamides. It is specific to Nylon-MXD6 only, and probably is due to the fact that the gas barrier properties of Nylon-MXD6 decrease at high relative humidity, as is usually the case at packaging of liquid food products.

The gas barrier layer may naturally be applied in any desirable thickness but according to a preferred embodiment of the present invention, which is particularly suitable for packaging containers intended for fruit juices with extended sheqlf-life, the gas barrier layer is applied on the core layer in a quantity of approx. 3–30 $g/m^2$, more preferably 4–12 $g/m^2$ and most preferably 5–8 $g/m^2$. The reason for this is that, in application quantities below 5 $g/m^2$, uncertainty in the process as regards application and barrier properties may be great. In application quantities above 8 $g/m^2$, the packaging laminate becomes less cost-effective.

On that side of the gas barrier layer which is turned to face away from the core layer, a polyolefin layer may be applied, which is bonded to the gas barrier layer by means of a layer of adhesive polymer applied between the gas barrier layer and the polyolefin layer. The polyolefin layer may comprise different types of polyethylene, for example ultra low density polyethylene (ULDPE), low density polyethylene (LDPE), linear low density polyethylene (LLDPE) and metallocene polyethylene (m-PE) or mixtures thereof. In particular, m-PE and mixtures of m-PE and certain of the above-disclosed polyethylene types give extremely tight seals on thermosealing of the packaging material into finished packaging containers, which also favours the gas tightness of the packaging container. The gas tightness of a packaging container thus depends both on the gas tightness of the packaging material per se and on how tight the seals are which it is possible to achieve in the production of packaging containers from the packaging material.

The layer of the abhesive polymer disposed between the gas barrier layer and the polyolefin layer consists, for example, of a polyolefin modified with carboxylic acid groups, for instance polyethylene grafted with maleic acid anhydride, such as certain types of Admer® and Bynel®. Alternatively, mixtures of adhesive polymer and PE may be employed in order to provide adhesion to the polyamide gas barrier layer.

The purpose of the two outer polyolefin layers is, on the one hand, to protect the packaging material against penetration by moisture and liquid from the outside and, on the other hand, the key function of rendering the packaging material sealable by conventional so-called thermosealing whereby mutually facing layers of plastic, under the supply of heat and pressure, can be joined together by surface fusion. Thermosealing realises mechanically strong, liquid-tight sealing joints during conversion of the packaging material into packaging containers. In order to realise seals possessing good tightness, the inner polyolefin layer is applied in a quantity of approx. 15–35 $g/m^2$, preferably approx. 25–30 $g/m^2$ and the outer polyolefin layer in a quantity of approx. 12–20, preferably 15–20 $g/m^2$. In the event of LDPE being in the inner layer, the quantity should be at least approx. 25 $g/m^2$, preferably at least approx. 30 $g/m^2$. The inner polyolefin layer 13 can also be applied as two or more separate polyolefin layers consisting of the same or different types of polyolefin in a quantity which in total amounts to the above-disclosed quantity.

The outer polyolefin layer, which is applied on the packaging material on that side of the core layer which, in the finished packaging container, is intended to be turned to face towards the outside, may be provided with suitable print of a decorative andlor informative nature for identifying a packed product.

According to a third preferred embodiment of the present invention, a packaging laminate having improved sealabilty properties in the process of converting into a packaging container is provided. It has been discovered that it is important to have certain minimum thicknesses surface weights of the two outer thermoplastic layers of the laminate in order to achieve optimally strong, gas-tight seals and reduced bulging. This is in particular apparent for a laminate with a three-layer co-extrusion coated barrier film. In such a three-layer laminate, less liquid barrier plastics are involved and the risk for bulging is increased. It has now been seen that, in order to increase the seal strength and reduce bulging the amount of sealing polymer in the innermost layer, i.e. the preferable low density polyethylene LDPE), on the inside of the packaging laminate should be at least 25 g/m$^2$, when the polyamide barrier layer and the tie layer are applied in quantities of about 6 and about 3 g/m$^2$ respectively, while the outermost layer of preferably LDPE should have a surface weight of about 15–20 g/m$^2$. Expressed with other words, there should be a certain relationship between the total amount of liquid barrier polymer on the inside of the paperboard and the amount of polymer on the outside of the paperboard. Thanks to the improvement in seal strength and tightness of the sealed joints towards liquids and gases, a packaging container with improved retention of vitamin C in the packaged product is furthermore obtained. Less moisture can penetrate into the laminate itself via the seals, which results in the improved resistance to bulging of the container walls. By accordingly adjusting the amounts of outer polyolefin layers so that the amount of LDPE in the innermost layer is at least 25 g/m$^2$, preferably 30 g/m$^2$, and the amount in the outside layer is less than 20 g/m$^2$, preferably about 16 g/m$^2$, the barrier layer being applied by 5–8 g/m$^2$ and the tie layer being applied by 3–6 g/m$^2$, these improved properties can be secured. This effect can be seen also for five-layer laminates, the amounts however being less critical than for the three-layer laminate. Most surprisingly, however, a three-layer laminate has improved seal strength and bulging properties in comparison to a corresponding five-layer laminate, in which a much higher amount of liquid barrier polyolefin is applied on the inside of the core layer towards the product.

According to a fourth preferred embodiment of the present invention, a cost-effective packaging laminate having a further extended shelf life together with good aroma and flavour retention properties, so-called non-scalping properties, is provided.

The Nylon-MXD6 material in itself also has excellent "aroma barrier" properties, i.e. barrier properties towards aroma and flavour substances, so-called non-scalping properties.

The gas barrier properties of the preferred laminate and the retention of vitamin C in the packaged product from the laminate are also further improved. These objects are achieved by a packaging laminate having a first barrier layer deposited on the inside of the paperboard substrate core layer and a second barrier layer, including a blend of Nylon-MXD6 and a second crystalline or semi-crystalline polyamide, deposited further towards the inside and the packaged product, and with relatively thin layers of tie and polyethylene product contact layer between the innermost barrier layer and the packaged product. Because of the lower amount of polyolefin polymers applied as innermost layers of the laminate, scalping of non-polar substances, such as certain flavour and aroma substances, from the product into the packaging material will be prevented. The aroma and flavour substances will migrate into the relatively thin product contact layer, but as they reach the barrier layer of the blend of Nylon-MXD6 and the second crystalline or semi-crystalline polyamide, they will be prevented from migrating further and, accordingly, less of said substances will be able to be absorbed into the polyolefin layers. Since the innermost polyethylene layer is rather thin in this preferred packaging laminate, it will not be sufficient for creating a sealing bond when converting and sealing the laminate into a packaging container. Therefore, further sealing layers of thermoplastic polymer are employed on the inner side of the core layer, on the other side of the innermost barrier layer, i.e. between the first and the second barrier layers. At sealing, the rather thin product contact layer and the innermost barrier layer will be "sealed through", i.e. the polymers in those layers will be molten away and the heat will reach and melt also the intermediate layers of heat sealable polymers. In this way, more heat sealable polymer will be available for creating a heat seal, despite the thin inside outer layer of the laminate.

This preferred high performance ESL packaging laminate will of course also have the advantage of the gas barrier layer in direct contact with the paperboard, providing a 30–40% improved gas barrier due to the lower moisture content in the gas barrier layer.

According to a further aspect of the invention, a method of manufacturing of the packaging laminate according to the invention is provided as set out in claim 14.

The laminated packaging material of the invention is preferably manufactured by means of a one-step co-extrusion process, in which all the polymer layers on the inside of the core layer are applied on the core by means of co-extrusion. A heat sealable polymer may be applied onto the outside of the core layer, i.e. the side of the core layer which is turned to face away from the barrier layer, before or after said one-step co-extrusion process. One important advantage with co-extrusion is that the heat from the molten polymer will be better preserved in a multilayer extrusion film until the extrusion film hits the substrate onto which it is extrusion coated, thus providing for improved adhesion to the substrate (due to high so-called "thermal inertia"). Another advantage is that, a further extrusion process step is saved, thus providing for a more time- and cost-effective process.

In order to obtain sufficient adhesion between the multilayer co-extruded film and the paperboard substrate, the surfaces should be activated by a pre-treatment such as treatment with corona and/or flame or ozone. Such surface activation treatment methods are well known in the art. Preferably, the paperboard substrate is pre-treated by means of flame treatment and/or corona treatment, of which flame treatment is the most preferred, while the freshly extruded film is preferably treated with ozone before it is coated onto the paperboard.

A configurationally stable packaging container produced from the laminated packaging material according to the present invention is disclosed in appended claim 16. The packaging container according to the invention may be provided with an opening device, such opening closing devices being known to the skilled person in the field of liquid food packaging.

ADVANTAGES

Thanks to the present invention, there will be realised a more environmentally friendly, cost- and productioneffective packaging material which displays excellent gas barrier properties, in particular against oxygen gas, even when exposed to a damp environment. The packaging material according to the present invention also possesses good internal cohesion in order to counteract delamination on use of the packaging material for the production of packaging containers intended for liquid foods, in particular fruit juices with so-called extended shelf-life, i.e. for cold storage for a period of up to 4–12 weeks.

BRIEF DESCRIPTION OF THE ACCOMPANYING DRAWINGS

Figure 1B:
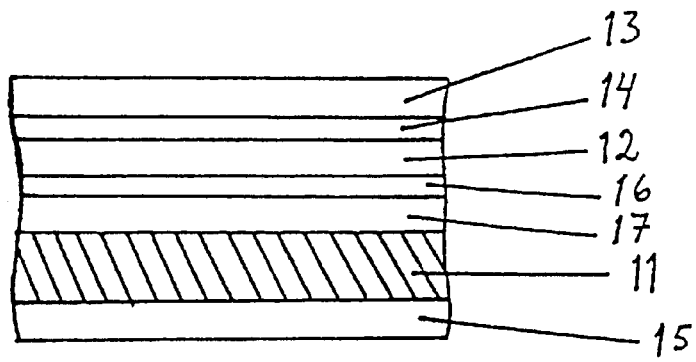
Figure 1C:
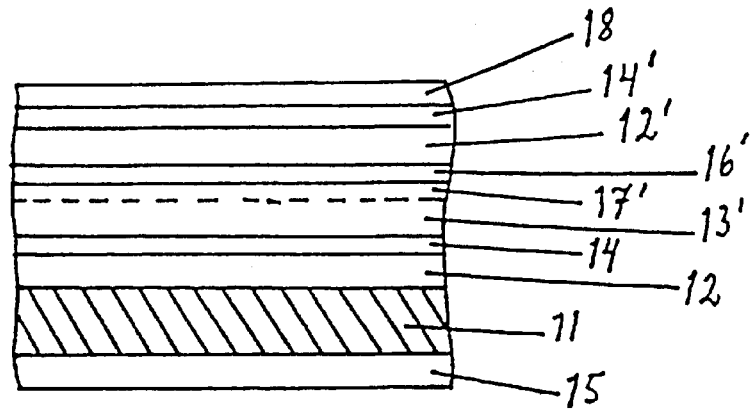
Figure 2A:
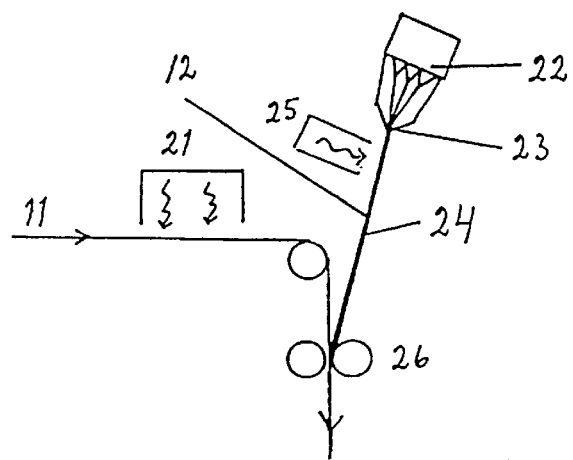
Figure 2B:
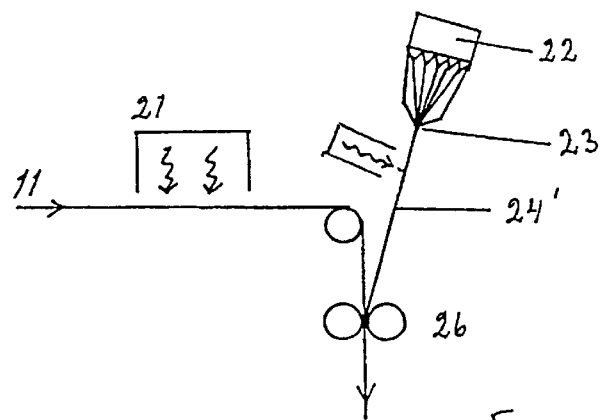
Figure 2C:
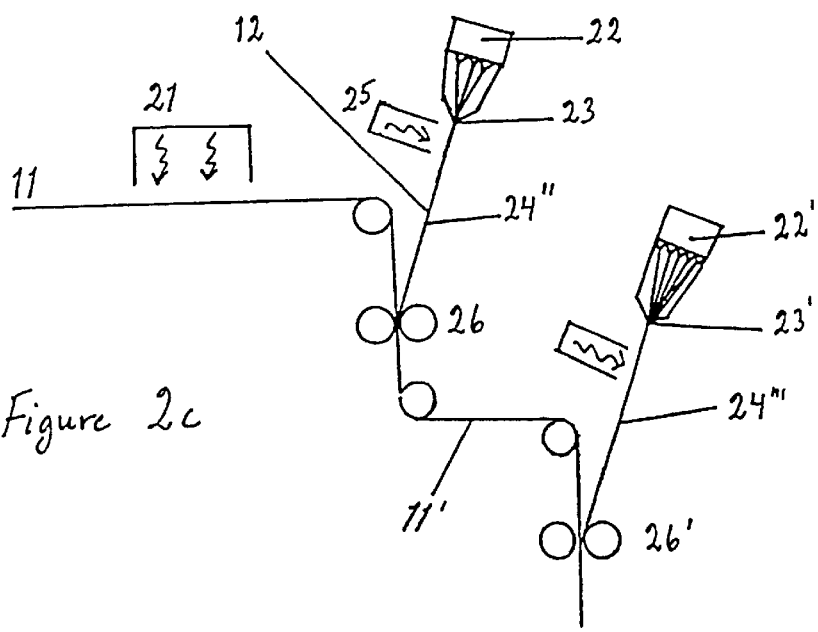
Figure 3:
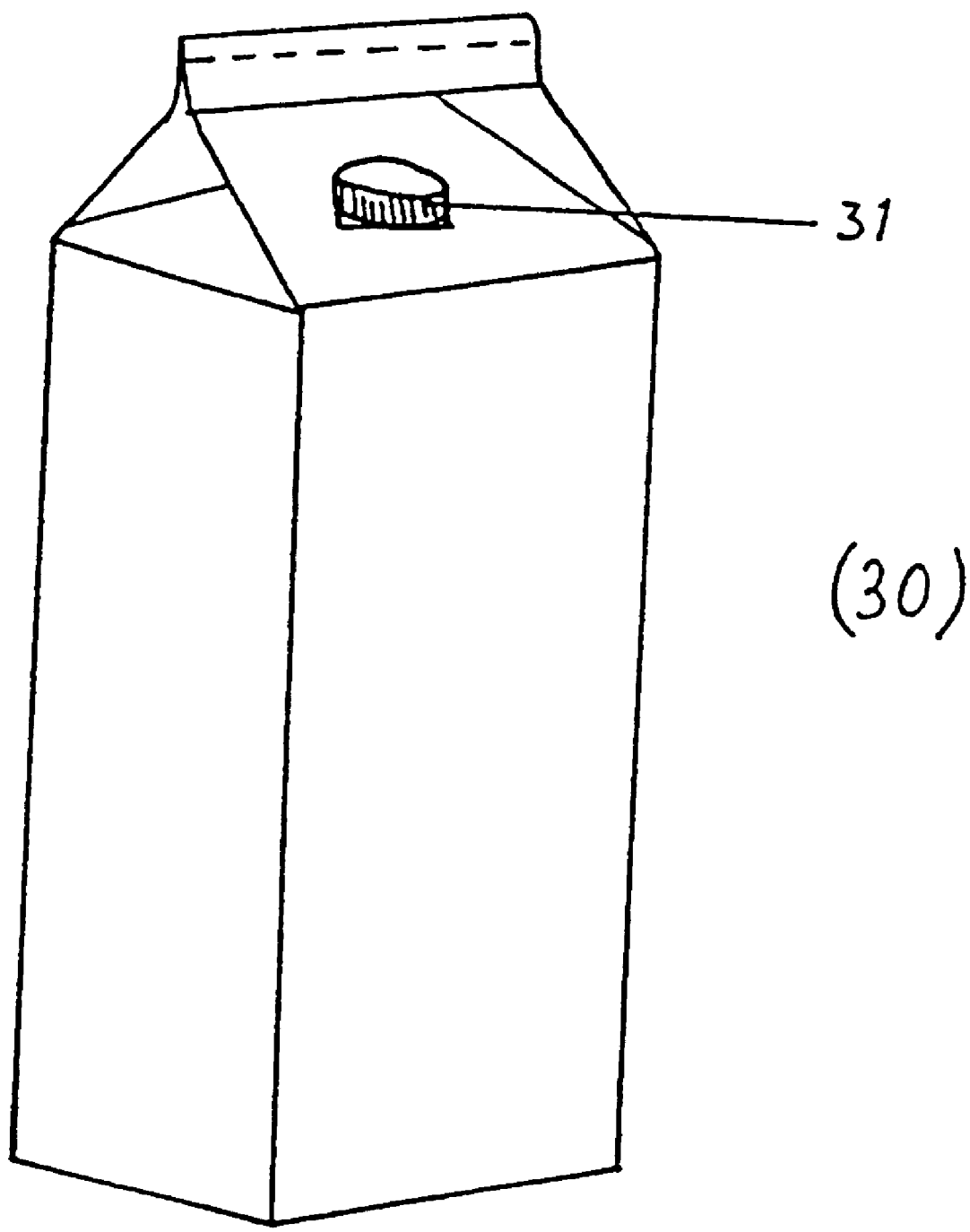

The present invention will now be described in greater detail hereinbelow with the aid of embodiments and with reference to the accompanying Drawings, in which:

FIGS. 1a, 1b and 1c are cross-sectional views of laminated packaging materials according to the present invention;

FIGS. 2a, 2b and 2c schematically illustrate a method of manufacturing of the respective laminated packaging material described in conjunction with FIG. 1; and FIG. 3 is a side elevation in perspective of a conventional, configurationally stable packaging container which is produced from a laminated packaging material according to the present invention.

DETAILED DESCRIPTION OF THE INVENTION

Referring to FIG. 1a, a cross-sectional view is shown of a preferred laminated packaging material 10a according to the present invention. The packaging material 10a includes a configurationally rigid but foldable core layer 11 of paper or paperboard. On one side of the core layer 11, there is applied a gas barrier layer 12 of a polyamide blend of Nylon-MXD6 and PA-6 or preferably a Nylon Clay Hybrid (NCH) based on PA-6.

The amount of Nylon-MXD6 in the polyamide blend is preferably 60–90 weight-% of the blend, most preferably 70–80 weight-%, and the amount of polyamide blend in the gas barrier layer is preferably 5–10 $g/m^2$.

The gas barrier layer 12 comprising the mixture of Nylon-MXD6 and PA-6 or NCH has proved to adhere very well to the core layer 11 of paper or paperboard. In comparison with lamination of the gas barrier layer 12 on the core layer 11 with an interjacent layer of polyethylene, it has proved that application of the gas barrier layer 12 direct on the core layer 11 resulted in an approximately 30–40 per cent improved oxygen gas barrier.

On the side of the gas barrier layer 12 which is turned to face away from the core layer 11, a polyolefin layer 13 is applied, which is bonded to the gas barrier layer 12 by means of a layer 14 of adhesive polymer applied between the gas barrier layer 12 and the polyolefin layer 13. The polyolefin layer 13 is preferably an LDPE or an m-PE, or a blend thereof, and is applied in an amount of preferably at least 25 $g/m^2$. The adhesive layer 14 consists of a polyethylene graft modified with maleic acid anhydride and is applied in an amount of about 3–6 $g/m^2$. The outer layer 15 on the opposite side of the core layer is likewise preferably an LDPE or an m-PE, or a blend of these two polymers, and is applied in an amount of preferably at least 15 $g/m^2$.

Referring to FIG. 1b, a cross-sectional view is shown of another preferred laminated packaging material 10b according to the present invention. The packaging material 10b includes a configurationally rigid but foldable core layer 11 of paper or paperboard. On one side of the core layer 11, there is applied a gas barrier layer 12 of a polyamide blend of Nylon-MXD6 and PA-6 or preferably a Nylon Clay Hybrid (NCH) based on PA-6. The amount of Nylon-MXD6 in the polyamide blend is preferably 60–90 weight-% of the blend, most preferably 70–80 weight-%, and the amount of polyamide blend in the gas barrier layer is preferably 5–10 $g/m^2$.

On the side of the gas barrier layer 12 which is turned to face away from the core layer 11, a polyolefin layer 13 is applied, which is bonded to the gas barrier layer 12 by means of a layer 14 of adhesive polymer applied between the gas barrier layer 12 and the polyolefin layer 13. The polyolefin layer 13 is preferably an LDPE or an m-PE, or a blend thereof, and is applied in an amount of preferably at least 25 $g/m^2$. The adhesive layer 14 consists of a polyethylene graft modified with maleic acid anhydride and is applied in an amount of about 3–6 $g/m^2$. The outer layer 15 on the opposite side of the core layer is likewise preferably an LDPE or an m-PE, or a blend of these two polymers, and is applied in an amount of preferably at least 15 $g/m^2$.

The gas barrier layer 12 is bonded to the core layer via intermediate bonding layers of an adhesive polymer layer 16 and a polyethylene layer 17, the adhesive polymer layer 16 being adjacent to the gas barrier layer 12 and being of the same polymer and approximately the same thickness as the adhesive polymer layer 14, and the polyethylene layer 17 being of the same polymer and approximately the same thickness as the layer 13.

Referring to FIG. 1c, a cross-sectional view is shown of another preferred laminated packaging material 10c according to the present invention. The packaging material 10c includes a configurationally rigid but foldable core layer 11 of paper or paperboard. On one side of the core layer 11, there is applied a first gas barrier layer 12 and a second gas barrier layer 12', both consisting essentially of a polyamide blend of Nylon-MXD6 and PA-6 or preferably a Nylon Clay Hybrid (NCH) based on PA-6. The amount of Nylon-MXD6 in the polyamide blend is preferably 60–90 weight-% of the blend, most preferably 70–80 weight-%, and the amount of polyamide blend in the gas barrier layer is preferably 5–10 $g/m^2$ each.

On the side of the gas barrier layer 12 which is turned to face away from the core layer 11, a polyolefin layer 13' is applied, which is bonded to the gas barrier layer 12 by means of a layer 14 of adhesive polymer applied between the gas barrier layer 12 and the polyolefin layer 13'. The polyolefin layer 13' is preferably an LDPE or an m-PE, or a blend thereof, and is applied in an amount of preferably at least 15–20 $g/m^2$. The adhesive layer 14 consists of a polyethylene graft modified with maleic acid anhydride and is applied in an amount of about 3–6 $g/m^2$. The outer layer 15 on the opposite side of the core layer is likewise preferably an LDPE or an m-PE, or a blend of these two polymers, and is applied in an amount of preferably at least 15–20 $g/m^2$.

On the side of the polyethylene layer 13', which is turned to face away from the core layer 11, the second gas and flavour barrier layer 12' is applied via intermediate bonding layers of an adhesive polymer layer 16' and a polyethylene layer 17'. Alternatively, in the case of co-extrusion of all layers in one extrusion operation, the polyethylene layers 13' and 17' are in fact applied as one layer only.

On the side of the gas barrier layer 12' which is turned to face away from the core layer 11, an innermost polyolefin layer 18 is applied, which is bonded to the gas barrier layer 12' by means of a layer 12' of adhesive polymer applied between the gas barrier layer 12' and the polyolefin layer 18. The innermost polyethylene layer 18 should be rather thin in order to prevent too much of aroma and flavour substances from the packaged product to escape into the packaging material. Preferably, this layer should be applied in an amount of about 6–12 g/m$^2$, preferably at most 10 g/m$^2$ and most preferably in an amount of about 7–9 g/m$^2$.

The adhesive polymer layers 16' and 12' include the same polymer as the adhesive polymer layer 14 and should have a thickness of 3–5, preferably 4 g/m$^2$, while the polyethylene layer 17' includes the same polymer and has approximately the same thickness as the innermost polyethylene layer 18.

The advantages with the laminated packaging material of FIG. 1c is, that the thin polyolefin layers 12' and 18 on the inside of the laminate together with the gas and aroma barrier layer 12' prevent non-polar substances from migrating from the packaged product into the packaging material, since the thin polyolefin layer will soon become saturated with such substances and the barrier layer 12' will efficiently block all further migration towards the interior of the packaging laminate.

The sealing properties of the laminate will still be excellent, since the intermediate polyolefin layers 13' and 17' together with the adhesive layer 16' will provide for a bulk of thermosealable polymer that compensates for the amount of heat sealable polymer that is missing in the innermost polyethylene layer 18. At application of heat and pressure along the sealing zones, the barrier layer 12' will become "sealed through", thus involving the bulk layers 13' and 17' in the heat fusion sealing operation.

By employing two gas barrier layers of polyamide blend of Nylon-MXD6 and PA-6 or preferably NCH, the gas barrier properties will be further improved. Furthermore, the rigidity of the laminate will become higher due to the relative stiffness of the polyamide layers and the fact that they are distanced from each other by layers of less rigid materials (giving rise to a so-called I-beam effect), which may improve the appearance of the package or even make it possible to use a core layer of a less rigid quality. The effect of bulging will accordingly be less seen in such a laminate, because of the higher total stiffness of the packaging laminate.

FIG. 2a schematically illustrates a method of manufacturing the laminated packaging material of FIG. 1a.

A web of the paperboard substrate core layer 11 is forwarded and passed through a surface activating station 21, where the surface is activated by means of corona and/or flame treatment, preferably flame treatment. The layers 12, 13 and 14 are co-extruded 22 in said order by generating a three-layer film in the feedblock 22, the film 24 being fed through the die 23 through an air-gap between the die and the paperboard substrate. The surface of layer 12, which is directed towards the paperboard surface, is preferably activation treated in the air gap by being exposed to ozone treatment 25. The co-extruded and still hot, molten multi-layer film 24 is fed together with the paperboard web through a roller nip 26 and thus being brought to adhere by means of pressure and the heat from the polymer layers. It is important that the amount of co-extruded polymer is sufficiently high to be kept warm enough until it is brought into contact with the paperboard substrate. This is normally the case if the three layers 12, 13 and 14 are co-extruded together onto the web. However, the co-extrusion of only layers 12 and 14, for example, would be less advantageous, because the two-layer co-extruded film would then cool off very quickly and not be warm in order to be able to adhere well to the paper web at 26.

The polyolefin layer 15 may be applied by extrusion coating on the side of the core layer which is turned to face away from the gas barrier layer 12, either before or after the co-extrusion coating method shown in FIG. 2a.

FIG. 2b schematically illustrates a method of manufacturing the laminated packaging material of FIG. 1b.

In addition to the described three-layer structure on the core layer 11, described in FIG. 1a, it is also possible without departing from the scope of the present invention, to realise laminate structures comprising both four and five layers laminated with the core layer 11. A four-layer structure then has an adhesive layer contact layer between the core layer and the gas barrier layer 12. In the event of a five-layer structure, as shown in FIG. 1b, a polyolefin layer 17, as well as an adhesive layer 16 are applied between the core layer 11 and the gas barrier layer 12, the polyolefin layer 17 being then disposed adjacent to the core layer 11. These multilayer structures are, however, more costly to produce since greater material quantities are consumed. The process is moreover less environmentally friendly (less source reduction) and more energy-consuming than the process of manufacturing three-layer structures as described in FIG. 2a.

Preferably, the laminate of FIG. 1b is produced by co-extrusion of the five layers 12, 13, 14, 16 and 17 onto the paperboard web 11 in an analogous manner to that of FIG. 2a. A web of the paperboard substrate core layer 11 is forwarded and passed through a surface activating station 21, where the surface is activated by means of corona and/or preferably flame treatment. The layers 17, 16, 12, 14 and 13 are co-extruded 22 in said order, thus providing a multilayer film 24' through the die 23, the layer 17 being directed towards the paperboard surface. The co-extruded and still hot, molten multilayer film 24' is preferably surface activation treated by means of ozone 25 and then fed together with the paperboard web through a roller nip 26, thus being brought to adhere together by means of pressure and the heat from the polymer layers.

Alternatively, the five layers on the inside of the core layer 11 may be applied in two steps, i.e. by first co-extruding the layers 17, 16, 12 and 14 onto the paperboard in a first step and then extrusion coating the layer 13 onto the layer 14 in a second step, or by first extruding the layer 17 onto the core layer in a first step and then co-extruding the four layers 16, 12, 14 and 13 onto the freshly applied layer 17, in a second step. These alternative methods would, however, involve a more cumbersome and less cost-effective lamination process.

The polyolefin layer 15 may be applied by extrusion coating on the side of the core layer which is turned to face away from the gas barrier layer 12, either before or after the co-extrusion coating method shown in FIG. 2b.

FIG. 2c schematically illustrates a method of manufacturing the laminated packaging material of FIG. 1c.

According to one embodiment, for the case where a seven-layer feedblock would be available, the laminate of FIG. 1c is produced by co-extrusion of seven layers 12, 14, 13'+17',16', 12', 12' and 18 onto the paperboard web 11 in an analogous manner to that of FIGS. 2a and 2b.

According to a preferred embodiment, the layers 12, 14 and 13' are co-extrusion coated onto the paperboard web in a first step and the layers 17',16', 12', 12' and 18 co-extrusion coated onto the layer 13' in a second step. Thus, a web of the paperboard substrate core layer 11 is forwarded and passed through a surface activating station 21, where the surface is activated by means of corona and/or preferably flame treatment. The layers 12, 14 and 13' are co-extruded in the feedblock 22 in said order, generating a three-layer film 24" being fed through the die 23 through an airgap between the die and the paperboard substrate. The layer 12 of the multilayer film 24" is directed towards the paperboard surface. Just before being brought into contact with the paper web, the surface of the layer 12 may preferably be pre-treated by ozone treatment 25. The co-extruded and still hot, molten, ozone-treated multilayer film 24" is fed together with the paperboard web through a roller nip 26 and thus being brought to adhere together by means of pressure and the heat from the polymer layers.

In the second step, layers 17',16', 12', 12' and 18 are co-extrusion coated 22' onto the laminate produced in step one, as a five-layer film 24'". Alternatively, a multilayer film of only the four layers 16', 12', 14'and 18 is extruded onto the laminate produced in step one. The co-extruded and still hot, molten, multilayer film 24'" is optionally surface activation treated with ozone and fed together with the coated paperboard web 11' through a roller nip 26', thus being brought to adhere together by means of pressure and the heat from the polymer layers.

The polyolefin layer 15 may be applied by extrusion coating on the side of the core layer which is turned to face away from the gas barrier layer 12, either before or after the co-extrusion coating method shown in FIG. 2c.

From the laminated packaging material 10 according to the present invention, liquid-tight, dimensionally stable packages 30 possessing good oxygen gas barrier properties can be produced using known packing and filling machines which, in a continuous process, form, fill and seal sheetor web-shaped packaging material into finished packages 30. One example of such a conventional packaging container is illustrated in FIG. 3.

The packaging container according to the invention may be provided with an opening device 31, such opening/closing devices being generally known in the field of liquid food packaging.

The process of converting the laminated packaging material into packaging containers may be carried out by, for example, first uniting the longitudinal edges of a web-shaped laminated packaging material 10 into a tube which is filled with the desired contents, whereafter individual packages 30 are separated by repeated transverse seals of the tube below the level of the contents. The packages 30 are separated from one another by incisions in the transverse seating zones and obtain the desired geometric configuration, normally paralielepipedic, by a final folding-forming and sealing process. Alternatively, packages 30 may be realised by fold-formation of sheets into a carton blank which is then filled and closed to form a finished package.

It will be obvious to a person skilled in the art that the present invention is not restricted to the illustrated embodiment, but that various modifications and alterations thereof may be made without departing from the scope of the inventive concept as this is defined in the appended Claims. For example, the material structures illustrated in FIG. 1 is, naturally, not restricted to the illustrated number of layers, but this number may be both greater and smaller, and may be freely varied in response to the desired use of the packaging material.

EXAMPLES

Example 1

Comparison of Barrier Properties: Different Polyamide Oxygen Barrier Lavers

Measurements made on complete packaging material structures, i.e. coextruded 5-layer structures (g/m$^2$): LDPE (13)/board/LDPE (10)/tie (5)/PA (barrier) (6)/tie (5)/LDPE (25) barrier layer coating weight: 6 and 10 g/m$^2$ respectively PA6: a standard PA-6 grade 1024B from USE lndustries Selar PA3508: amorphous polyamide The oxygen gas permeability values of a PA6 when used alone in a gas barrier layer are about as high as for the Selar polyamide at 0% RH, but higher at higher relative humidity. Selar PA or PA6 as gas barrier alone, is thus not economically interesting for ESL packaging.

Test Method: "Mocon oxtran", 1000 flatsample method, testgas: 100% oxygen, T=23° C., t=24 h, RH: 50%, 1 atm, n (number of samples)=5.

TABLE 1

| Polyamide grade in barrier layer | Permeability (cc/m$^2$) 6 g/m$^2$ | Permeability (cc/m$^2$) 10 g/m$^2$ |
| --- | --- | --- |
| Selar (a)PA3508 | 80.1 cc/m$^2$ | 58.3 cc/m$^2$ |
| 60% MXD6/40% PA6 | 50.4 cc/m$^2$ | 26.3 cc/m$^2$ |
| 60% MXD6/40% PA6-NCH (1022CM1) | 29.6 cc/m$^2$ | 22.6 cc/m$^2$ |
| 80% MXD6/20% PA6 | 33.3 cc/m$^2$ | 19.8 cc/m$^2$ |
| 100% MXD6 | — | 14.6 cc/m$^2$ |

Conclusions: The blend of Nylon-MXD6/PA6 had better oxygen barrier properties than the amorphous PA. The Nylon-MXD6-blend with a Nylon Clay Hybrid- PA6 had better oxygen barrier properties than the corresponding Nylon-MXD6-blends with standard PA6 grades. Although a gas barrier value has been obtained for a laminate having a 100% Nylon-MXD6 gas barrier layer, such a laminate is not usable in ractice because the gas barrier layer will crack and delaminate and allow oxygen to permeate into a packaging container made thereof. A Nylon-MXD6 blend with 80 weight % Nylon-MXD6 has better oxygen barrier properties than the corresponding 60 weight % blend. Although it has not been shown in these particular examples, it has been found by other trials that an optimal balance between gas barrier properties and mechanical properties in a package produced from the laminate are obtained at about 70–80 weight % of Nylon-MXD6 in the blend. At more than 90 weight-% of the Nylon-MXD6, the barrier layer becomes more brittle and inflexible and thus more apt to cracking and delaminating.

EXAMPLE 2

Blend quality of the Nylon-MXD6 Polyamide Blend

The Influence of Different Melt-temperature at Blending of the Nylon-MXD6/PA6-Blend In order to obtain a two-phase immiscible blend, i.e. a blend indicating two melt points or melt intervals at DSC measurement, the polymers should be blended at a low melt temperature, relatively short blending time and using low shear at blending. In practice, the different polymer granules are dry blended and then melt-mixed in an extruder while feeding the polymer to the extrusion die. A two-phase blend provides better oxygen barrier properties than a blend which is of the one-phase type.

The following observation was made in small scale trials with the same extrusion equipment and die. Oxygen permeability tests were performed on extruded monolayer films (200±10% microns).

Method: Mocon oxtran, 1000 flatsample method, testgas: 100% oxygen, T=23° C., t=24 h, RH: 50%, 1 atm, n (number of samples)=5.

TABLE 2

| PA-blend | Melt-temperature | Oxygen permeability |
|---|---|---|
| 60% MXD6/40% PA6-NCH | 290° C. | 1.25 cc/m$^2$ |
| 60% MXD6/40% PA6-NCH | 270° C. | 0.43 cc/m$^2$ |

Conclusions: a film produced at the lower melt blend temperature had more than 100% better oxygen barrier properties than a film with high melt blend temperature, indicating that the blending at higher temperature provides a blend that is more of the miscible type.

EXAMPLE 3

Comparison of Barrier Properties: 3-layer Vs. 5-layer Structure

Measurement of complete packaging material structures of factory scale co-extrusion coating produced material.

5-layer structure (g/m$^2$):

LDPE (16)/board/LDPE (15)/tie (5)/PA-blend (7)/tie (5)/LDPE (20)

3-layer structure (g/m$^2$):

LDPE (16)/board/ PA-blend (7)/tie (5)/LDPE (20) polyamide blend: 7g/m$^2$, 75% MXD6+25% PA6-NCH Method: Mocon oxtran, 1000 flatsample method, testgas: 21% oxygen, T=23° C., t=24 h, RH: 80%, 1 atm, n (number of samples)=2.

TABLE 3

| | Oxygen permeability | |
|---|---|---|
| Structure | First value | Second value |
| 5-layer | 28.9 cc/g/m$^2$ | 28.3 cc/g/m$^2$ |
| 3-layer | 20.2 cc/g/m$^2$ | 20.9 cc/g/m$^2$ |

Conclusion: The 3-layer structure provided a 40% better oxygen barrier than the 5-layer structure.

EXAMPLE 4

The Eeffect of the Weight Ratio Between and Grammages of the Outer Polyethylene layers Bulging was measured in two separate test after 10 weeks chilled storage, each test comprising 10 packages filled with orange juice, the number of mm of the width between the walls of the packaging container exceeding 76 mm. The values given in the table are the number of millimeters exceeding or falling below the value for the reference package having the structure (g/m$^2$). LDPE (16)/board/ LDPE (15)/tie (5)/EVOH (5)/tie (5)/LDPE (20)

A similar structure with a gas barrier layer of a 75:25 Nylon-MXD6 blend with PA6 NCH has about the same bulging properties as the EVOH reference sample (measured in other tests).

Leakage frequency was measured after random vibrations test according to ASTM D4729 & D4169, with a stacked random vibration sweep conducted for 15 minutes. n (number of packages)=160

Laminates tested (g/m$^2$): LDPE(16)/board/ 75:25 MXD6:PA6NCH (6)/tie (3)/LDPE (X)

TABLE 4A

| | | Leakage | | |
|---|---|---|---|---|
| No | Innermost layer g/m$^2$ | total amount of polymer on inside g/m$^2$ | Outside g/m$^2$ | Leakage frequency (number) of packages per 160 packages) Seal strength |
| 1a | 20 | 29 | 16 | 46 |
| 2a | 25 | 34 | 16 | 20 |
| 3a | 30 | 39 | 16 | 8 |

Conclusion: fewer leakages occur when the amount of polymer (barrier+tie+LDPE) on the inside of the paperboard is high.

TABLE 4B

| | | Bulging | | |
|---|---|---|---|---|
| No | Innermost layer g/m$^2$ | total inside | outside | Bulging in comparison with reference sample |
| 1a | 20 | 29 | 16 | +2 mm |
| 1b | | | 20 | — |
| 2a | 25 | 34 | 16 | 0 mm |
| 2b | | | 20 | +2 mm |
| 3a | 30 | 39 | 16 | −2 mm |
| 3b | | | 20 | 0 mm |

Conclusion: bulging decreases when the polymer amount on the outside is low and the amount on the inside is high.

In order to keep the level of bulging of the three layer laminate at the same level or below that of the reference five layer laminate, the amount of LDPE in the innermost layer must be at least 25 g/m$^2$, preferably at least 30 g/m$^2$. The outside LDPE layer should be less than 20 g/m$^2$, preferably about 16 g/m$^2$. Below 16 g/m$^2$, the printability of the outside decor layer may be impaired.

The bulging results show that by applying a thick inside layer at a constant outside layer, less bulging is obtained. Unexpectedly, however, when keeping the inside amount high and the outside amount low, the three layer structure shows less bulging than the five layer reference sample. This is unexpected and surpising, because the amount of liquid barrier polyolefin the inside of the five layer paperboard laminate is much higher, i.e. in total 45 g/m$^2$, (the total inside polymer in the five-layer laminate being 50 g/m$^2$).

What is claimed is:

1. A laminated packaging material comprising a core layer of paper or paperboard and a gas barrier layer of polyamide, including a condensation polymer of metaxylene diamine and adipic acid (Nylon-MXD6), applied on one side of the core layer together with at least one layer of heat sealable plastics by means of co-extrusion coating, wherein the gas barrier layer is a polyamide blend including Nylon-MXD6 and a second crystalline or semi-crystalline polyamide.

2. The laminated packaging material as claimed in claim 1, wherein the polyamide blend is a two-phase immiscible blend of which DSC measurement indicates two melt intervals.

3. The laminated packaging material as claimed in claim 1, wherein the proportion of Nylon-MXD6 which is included in the polyamide blend amounts to 60–90 weight per cent.

4. The laminated packaging material as claimed in claim 1, wherein said second crystalline or semi-crystalline polyamide is polyamide-6 (PA-6).

5. The laminated packaging material as claimed in claim 1, wherein said second crystalline or semi-crystalline polyamide is a Nylon Clay Hybrid (NCH).

6. The laminated packaging material as claimed in claim 1, wherein the gas barrier layer of polyamide serving as gas barrier is applied directly by means of co-extrusion on the core layer of paper or paperboard without any interjacent lamination or adhesive layer.

7. The laminated packaging material as claimed in claim 1, wherein the gas barrier layer is applied in a quantity of approx. 4–12 $g/m^2$.

8. The laminated packaging material as claimed in claim 1, wherein the other side of the gas barrier layer facing away from the core layer is bonded to a polyethylene layer by means of an interjacent layer of adhesive polymer.

9. The laminated packaging material as claimed in claim 8, wherein said layer of adhesive polymer consists of polyethylene grafted with maleic acid anhydride.

10. The laminated packaging material as claimed in claim 1, wherein the other side of the core layer facing away from the gas barrier layer is also coated with an outer layer of polyethylene.

11. The laminated packaging material as claimed in claim 1, wherein said polyolefin layers substantially consist of LDPE or a blend of LDPE and m-PE, that the polyethylene layer is applied in a quantity of 15–20 $g/m^2$ and that the quantity of polymer in the innermost layer is at least 25 $g/m^2$.

12. The laminated packaging material as claimed in claim 1, wherein it comprises a first gas barrier layer and a second gas barrier layer applied on one side of the core layer both barrier layers consisting essentially of a polyamide blend of Nylon-MXD6 and a second crystalline or semi-crystalline polyamide.

13. The laminated packaging material as claimed in claim 12, wherein it has an innermost product contact layer of polyethylene, which is applied in a quantity of about 7–9 $g/m^2$.

14. Method of manufacturing the laminated packaging material as defined in claim 1, comprising the steps of co-extruding a multilayer film including the gas barrier layer, pre-treating the surface of the core layer substrate in order to activate it, pre-treating the contact surface of the multilayer film with ozone and subsequently bringing the pre-treated surfaces to adhere to each other by the application of pressure.

15. Method according to claim 14, wherein the core layer substrate is surface activation treated by means of corona or flame treatment and the core layer contact layer side of the multilayer film is treated with ozone.

16. A configurationally stable packaging container for the storage of liquid, oxygen gas-sensitive foods with extended shelf-life, wherein it is produced by fold-formation and sealing of a sheet- or web-shaped blank of a laminated packaging material as claimed in claim 1.

17. The laminated packaging material as claimed in claim 1, wherein the proportion of Nylon-MXD6 which is included in the polyamide blend amounts 70–80 weight pet cent.

18. The laminated packaging material as claimed in claim 1, wherein the gas barrier layer is applied in a quantity of approx. 5–8 $g/m^2$.

19. The laminated packaging material as claimed in claim 1, wherein said polyolefin layers substantially consist of LDPE or a blend of LDPE and m-PE, that the polyethylene layer is applied in a quantity of 15–20 $g/m^2$ and that the quantity of polymer in the innermost layer is at least 30 $g/m^2$.

* * * * *